United States Patent Office 3,007,962
Patented Nov. 7, 1961

3,007,962
2-ALKOXYMETHYL-4-CHLOROPHENOXY-ACETATES
Jean Metivier, Arpajon, France, assignor to Societe des Usines Chimiques Rhone-Poulenc, Paris, France, a French body corporate
No Drawing. Filed Mar. 19, 1959, Ser. No. 800,371
5 Claims. (Cl. 260—521)

This invention is for improvements in or relating to aryloxyaliphatic compounds, to processes for their preparation and to compositions containing one or more of such compounds and useful for the modification of plant growth.

The use in agriculture and horiculture of various types of chemicals for the purpose of modifying plant growth is now a customary practice, and a considerable number of such substances are employed on a very large scale for producing various different effects upon plant growth. These effects include modification of growth for the purpose of enhancing the useful yield of crops later to be gathered from the plants so modified, and the destruction of unwanted plants, i.e. weeds, in areas containing useful crops.

Of recent years, the so-called "auxins" have become particularly important as selective herbicides, their lethal effect being a physiological and systemic one rather than that of a plant poison which simply alters and destroys. The advent of such highly successful auxins as 2:4-dichlorophenoxyacetic and 4-chloro-2-methylphenoxyacetic acid derivatives has greatly stimulated research and development throughout the world but there is still much that is not known concerning the precise relationship between chemical structure of the auxin and effect upon plant growth as to variation of effect according to concentration and structure of the chemical employed (in some cases the chemical acts at low concentration to modify plant growth in a useful way and at a higher concentration to kill the plant) such that prediction as to effect on plant growth of change in chemical structure of the auxin cannot yet be made with anything like reasonable certainty. This is particularly so in the field of the aryloxyaliphatic compounds as is emphasised by Shaw and Gentner ("Weeds," Journal of the Weed Society of America V, (2): 75 to 90, 1957).

It is the object of this invention to provide new aryloxyaliphatic compounds and compositions containing them which possess useful plant growth regulating properties which could not have been predicted from knowledge of their chemical structure.

The compounds of the present invention are the phenoxyaliphatic acids of the general formula:

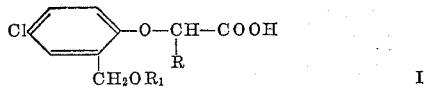   I (wherein R represents a hydrogen atom or a methyl group and $R_1$ represents a lower alkyl group) and the alkali metal, ammonium and amine salts, esters and amides of these acids. Preferably the amine salts are those derived from aliphatic or cycloaliphatic amines and the esters are those containing a lower alkyl group in the ester grouping. The amides may be N-mono- or di-substituted by lower alkyl groups.

The term "lower alkyl" as used in this specification and in the appended claims means an alkyl group containing not more than four carbon atoms.

Individual acids of the present invention which (together with their stated derivatives) are of special importance are those in which R is a hydrogen atom and $R_1$ is a methyl or ethyl group, viz. 2-methoxymethyl-4-chlorophenoxy acetic acid and 2-ethoxymethyl-4-chlorophenoxyacetic acid and their derivatives.

According to a feature of the present invention, the phenoxyaliphatic compounds are prepared by the process which comprises reacting a phenol of the formula:

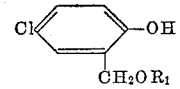   II (wherein $R_1$ is as hereinbefore defined) with a derivative of an aliphatic carboxylic acid of the formula:

$$X-\underset{R}{CH}-COOH$$   III or an alkali metal, ammonium or amine salt, ester or amide thereof (wherein X represents the acid residue of a reactive ester, such as a halogen atom or a sulphuric or sulphonic ester residue, being preferably a chlorine or bromine atom, and R is as hereinbefore defined).

It is particularly advantageous to carry out the reaction in the presence of an alkaline condensing agent, such as sodium hydroxide, potassium hydroxide or sodium carbonate, which may be added to a mixture of the reactants. Alternatively, the phenol may first be converted into alkali metal phenate before being reacted with the carboxylic acid derivative, which is then employed in the form of an alkali metal salt. It is convenient to effect the reaction in an inorganic solvent medium such as water, or an organic solvent medium such as an alcohol, e.g. ethanol, or a hydrocarbon, e.g. benzene or toluene.

According to a still further feature of the invention, the phenoxyaliphatic compounds are prepared by the process which comprises reacting a phenoxyaliphatic acid of the formula:

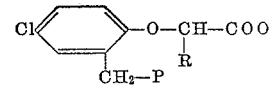   IV or an alkali metal, ammonium or amine salt, ester or amide thereof, with a compound of the formula Q—$R_1$ (wherein one of the symbols P and Q represents a group OM, wherein M represents an alkali metal atom, and the other the acid residue of a reactive ester, such as a halogen atom, preferably chlorine or bromine, or a sulphuric or sulphonic ester residue). The reaction is preferably effected in an inert solvent, such as an alcohol.

The new phenoxyaliphatic compounds of the present invention have been found to possess very useful phytohormonal activity, that is to say, in very small doses, they modify the growth of plants in one or more ways. This activity may be demonstrated in various ways. Thus, in the laboratory these compounds manifest their action by accelerating the functioning of meristematic tissue (growth in thickness) as is shown by the lanolin ring test using a composition containing 1% of the active compound, by the formation of new organs (roots) as shown by tests for the formation of roots on petioles of tomato leaves or beanstalks, and by the production of parthenocarpic fruits, which, because they have not been naturally fertilised, are seedless, as shown by the treatment of emasculated tomato flowers.

The new compounds of the invention differ from previously known compounds of similar constitution, for example, 4-chloro-, 2:4-dichloro- and 2-methyl-4-chlorophenoxyacetic acids and their derivatives, by being distinctly less phytotoxic. This difference enables their phytohormonal properties to be of substantial practical use.

For agricultural purposes the compounds of this invention may be employed in any of the physical forms in which plant-growth regulants or herbicides of the 2:4-dichlorophenoxyacetic acid type are customarily used; in all such cases in association with an inert diluent and in a concentration of at least 0.5 part per million parts of diluent. In the case of water-soluble compounds, e.g. the alkali metal salts, it is convenient to employ an aqueous solution where application in liquid form is desired. Alternatively, they may be used as solid compositions in conjunction, therefore, with solid diluents such as limestone, kaolin, talc, calcined magnesia, kieselguhr, tricalcium phosphate, sodium sulphate, powdered cork or other such inert material. The solid compositions may be obtained by grinding the active substance with the inert material, or impregnating the inert material with a solution of the active substance in a volatile solvent which is subsequently evaporated off. In the case of liquid preparations it is generally useful to incorporate a wetting, dispersing or emulsifying agent of the ionic or non-ionic type, the latter being preferred since they are not affected by electrolytes. The latter type of formulation is preferably made up as a self-emulsifying concentrate containing the active substance dissolved in the dispersing agent or in a solvent compatible with that dispersing agent, the composition being made ready for use by the simple addition of water. Specific compositions include aqueous solutions of water-soluble salts or amides which may contain a wetting agent, wetting powders containing either acid or amide in association with diluent powder and wetting agent, oil emulsions containing one or more of the esters and micronised oil suspensions of either acid or amide.

The following examples illustrate the invention.

Example I

To a suspension of 64.3 g. of 2-hydroxymethyl-4-chlorophenoxyacetic acid in 300 cc. of cholorform are added over a period of 10 minutes 107 g. of thionyl chloride. After agitation for 2 hours at room temperature, the mixture is refluxed until the evolution of gas ceases. After cooling, the chloroform and excess thionyl chloride are driven off under reduced pressure.

The residue obtained is taken up in 250 cc. of benzene, and the solution is poured into 330 cc. of a 2.25 N sodium methoxide solution in methanol, the temperature being maintained at about 40° C. After agitation for 2 hours at room temperature, the reaction mixture is refluxed for 3 hours. The sodium chloride, which is formed, is filtered off and the filtrate is concentrated under reduced pressure.

The oily residue, which is obtained (76 g.), in 300 cc. of 2 N sodium hydroxide is heated under reflux until it is completely dissolved. After treatment with decolorising charcoal and filtration, the solution is acidified with 60 cc. of hydrochloric acid ($d=1.19$). The oil which is precipitated rapidly crystallises. After drying in vacuo in the presence of sulphuric acid, 55 g. of 2-methoxymethyl-4-chlorophenoxyacetic acid, M.P. 78° C., are obtained. On recrystallisation from ethyl acetate, the product melts at 79° C.

Example II

To a suspension of 108.2 g. of 2-hydroxymethyl-4-chlorophenoxyacetic acid in 750 cc. of chloroform are added over a period of 15 minutes 178.5 g. of thionyl chloride. After agitation for 2 hours at room temperature, the reaction mixture is refluxed until evolution of gas ceases. After cooling, the chloroform and excess thionyl chloride are driven off under reduced pressure. The residual oil is taken up in 500 cc. of benzene, and the solution is poured into 500 cc. of a 2.5 N sodium ethoxide solution in ethanol, the temperature being maintained below 40° C. After standing for 1 hour at room temperature, the mixture is refluxed for 2 hours. The sodium chloride, which is formed, is filtered off and the solvent evaporated under reduced pressure.

The oily residue (126 g.) is taken up in 500 cc. of 2 N sodium hydroxide and the mixture refluxed until the residue is completely dissolved. After treatment with decolorising charcoal and filtration, the solution obtained is acidified with 150 cc. of hydrochloric acid ($d=1.19$). The oil which forms is extracted with ether, washed with water and dried over sodium sulphate. After concentration under reduced pressure, there remains a viscous oil weighing 100 g., which gradually crystallises. After recrystallisation from 1500 cc. of cyclohexane, there are obtained 80 g. of 2-ethoxy-methyl-4-chlorophenoxyacetic acid, M.P. 75–76° C.

Example III

A concentrate is prepared by dissolving 5 g. of 2-methoxymethyl-4-chlorophenoxyacetic acid in 50 cc. of acetone, and adding 10 g. of Scurol AO (a polycondensate of ethylene oxide and oleic acid). For application, one part of the concentrate is mixed with 500 to 1000 parts of water. This composition can be used on tomatoes to produce parthenocarpic fruits.

Example IV

A liquid composition having the following composition is prepared:

| | | |
|---|---|---|
| 2-methoxymethyl-4-chlorophenoxyacetic acid | g. | 20 |
| N sodium hydroxide | cc. | 87 |
| Acetone | cc. | 20 |
| Glycerin | cc. | 150 |
| Water sufficient to make composition to | cc. | 1,000 |

The composition, when diluted to the extent of 2 to 20 cc. per litre of water, is suitable for treating tomatoes.

Example V 5 g. of 2-ethoxymethyl-4-chlorophenoxyacetic acid as the sodium salt are intimately mixed with 95 g. of sodium sulphate. The powder thus prepared can be dissolved in water to give a solution of concentration 1 to 10 g. per litre of water for use in the propagation of plants by cuttings.

I claim:
1. A member of the class consisting of phenoxyacetic acids of the general formula:

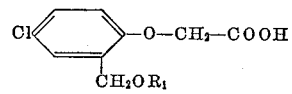

wherein $R_1$ represents a lower alkyl group, and alkali metal salts thereof.

2. The compound 2-methoxymethyl-4-chlorophenoxy acetic acid.

3. An alkali metal salt of 2-methoxymethyl-4-chlorophenoxy acetic acid.

4. The compound 2-ethoxymethyl-4-chlorophenoxyacetic acid.

5. An alkali metal salt of 2-ethoxymethyl-4-chlorophenoxy acetic acid.

References Cited in the file of this patent

UNITED STATES PATENTS

| | | |
|---|---|---|
| 2,348,231 | Strain et al. | May 9, 1944 |
| 2,396,513 | Jones | Mar. 12, 1946 |
| 2,715,644 | Wright et al. | Aug. 16, 1955 |
| 2,761,774 | Davie | Sept. 4, 1956 |
| 2,914,558 | Cooper | Nov. 24, 1959 |
| 2,927,940 | Metivier et al. | Mar. 8, 1960 |

UNITED STATES PATENT OFFICE
CERTIFICATE OF CORRECTION

Patent No. 3,007,962                                   November 7, 1961

Jean Metivier

It is hereby certified that error appears in the above numbered patent requiring correction and that the said Letters Patent should read as corrected below.

In the heading to the printed specification, between lines 7 and 8, insert -- Claims priority, application France Apr. 28, 1958 --.

Signed and sealed this 18th day of September 1962.

(SEAL)
Attest:

ERNEST W. SWIDER
Attesting Officer

DAVID L. LADD
Commissioner of Patents